J. FERRIER.
PROPELLER PARTICULARLY FOR USE ON AEROPLANES AND OTHER AIRCRAFT.
APPLICATION FILED JULY 29, 1918.

1,310,330.

Patented July 15, 1919.
3 SHEETS—SHEET 1.

Inventor
J. Ferrier.
By H. R. Kerslake
Atty

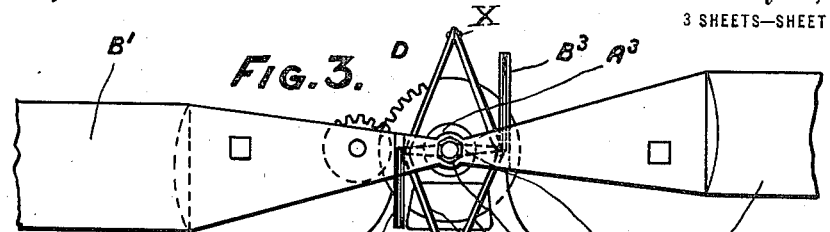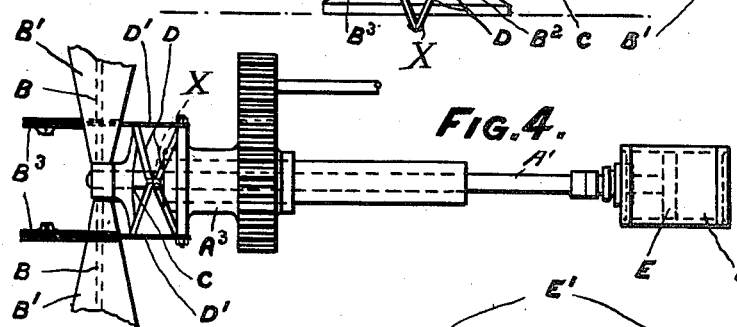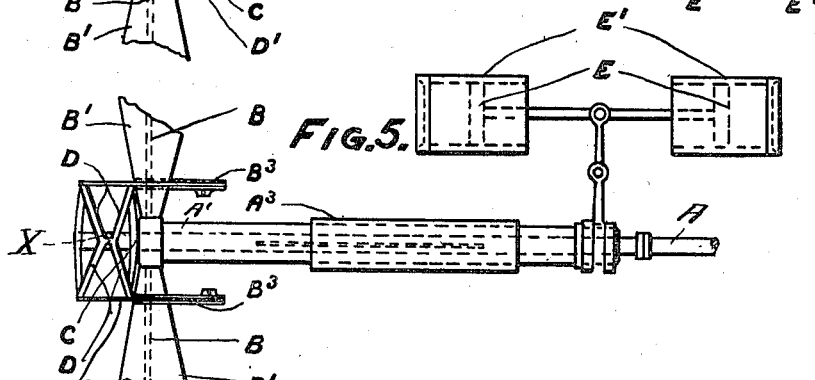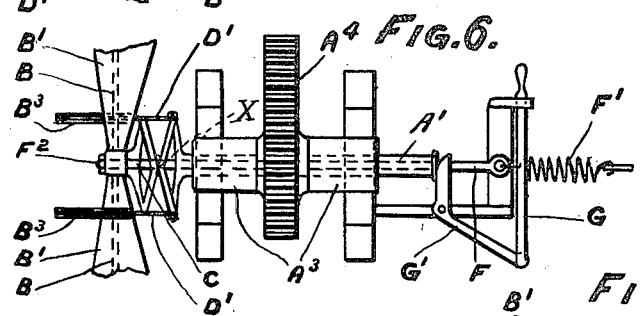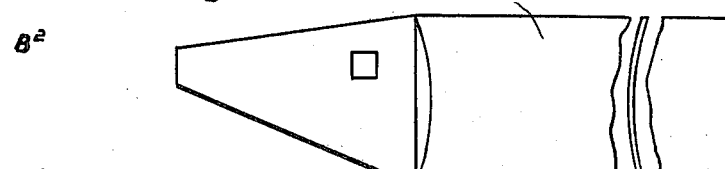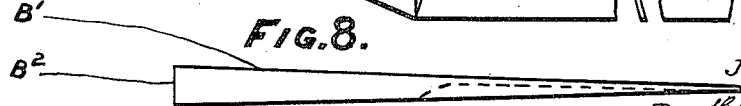

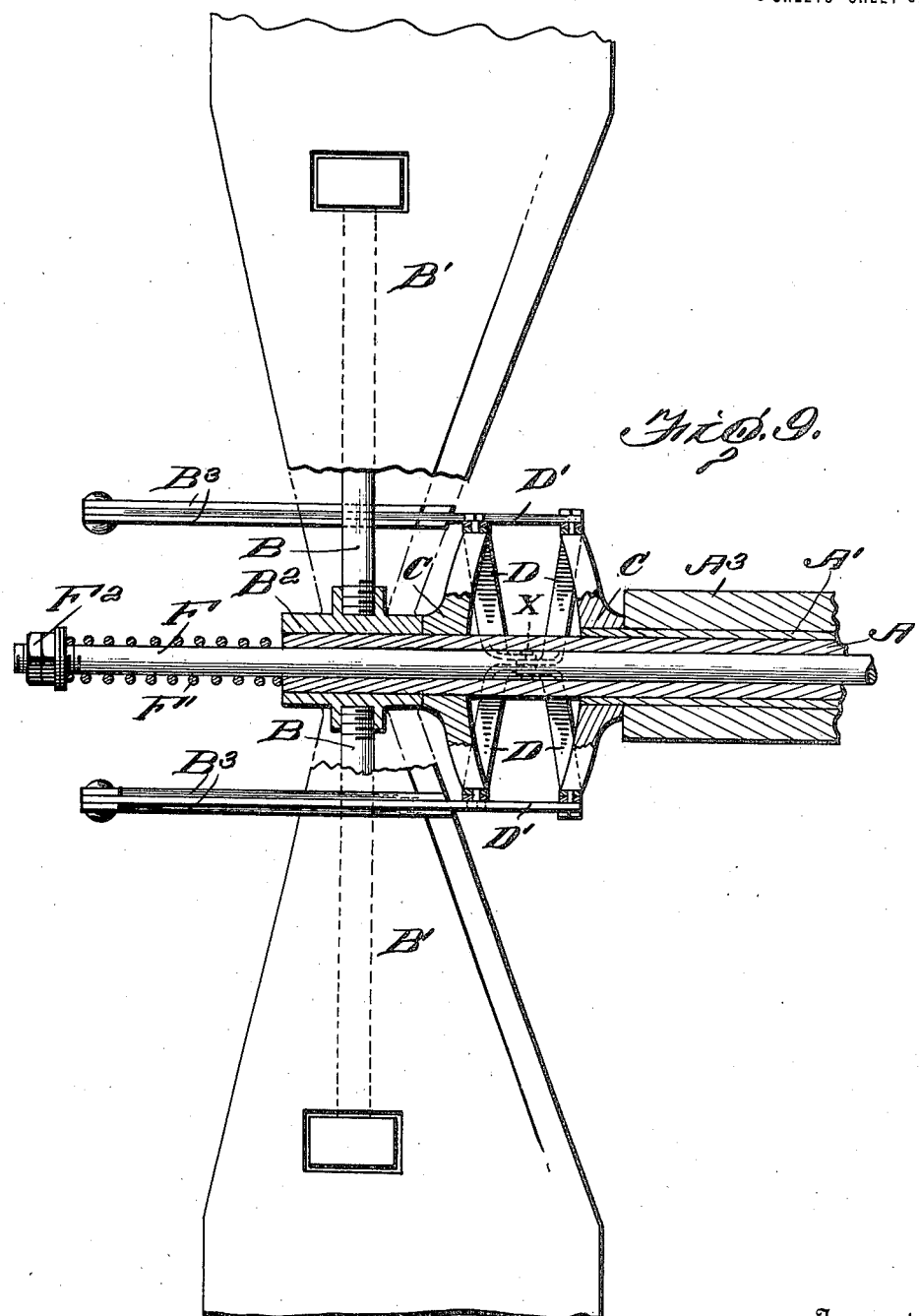

UNITED STATES PATENT OFFICE.

JAMES FERRIER, OF SURAT, QUEENSLAND, AUSTRALIA.

PROPELLER PARTICULARLY FOR USE ON AEROPLANES AND OTHER AIRCRAFT.

1,310,330. Specification of Letters Patent. Patented July 15, 1919.

Application filed July 29, 1918. Serial No. 247,329.

*To all whom it may concern:*

Be it known that I, JAMES FERRIER, subject of the King of Great Britain, residing at Highview, Surat, Queensland, Australia, have invented new and useful Improvements in Propellers Particularly for Use on Aeroplanes and other Aircraft, of which the following is a specification.

This invention relates to improvements in propellers particularly for use on aeroplanes and other air craft, the object being to provide a feathering propeller, which will accommodate itself to the direction and force of the wind that is, for example, when the aeroplane or other air craft is flying against the wind, the angle of incidence or pitch of the propeller will be more or less increased according to the strength of the wind, and, when going with the wind, the angle of incidence or pitch will be reduced, thereby increasing the efficiency of the propeller and engine and at the same time allowing them to be run at a more uniform rate of speed.

In carrying out my invention, I make the shaft of the propeller in two parts, a slidable part and a non-slidable part. One portion projects beyond both ends of the other portion. Both portions are capable of rotation, and one portion is capable of being moved lengthwise relative to the other, the whole shaft being carried in suitable bearings and arranged to be rotated by and from any source of power supply. Means are provided whereby both portions are caused to rotate in unison while at the same time one is permitted to slide within or outside the other, as the case may be, with a minimum of friction.

Blades are pivotally carried on one portion of the shaft and means are provided whereby according to the direction and force of the wind the pitch or angle of incidence of the blade varies.

In order that my invention may be better understood, I will now describe same with the aid of the accompanying drawings in which—

Fig. 3 is an end elevation.

Fig. 4 is a plan of an alternative arrangement.

Fig. 5 is a plan of another alternative arrangement.

Fig. 6 is a detail showing an alternative mechanism for controlling the movement of the blades.

Figs. 7 and 8 are details of the blades.

Fig. 9 is a detail sectional view of a portion of the mechanism shown in Figs. 1, 2 and 3.

Figure 1:
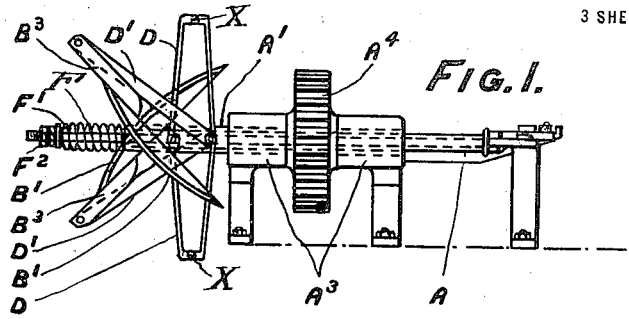
Figure 1 is a side elevation of my propeller.
Figure 2:
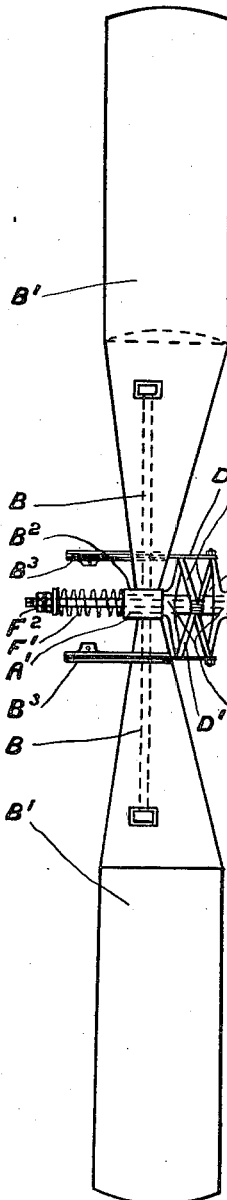
Fig. 2 is a plan.
Figure 2:
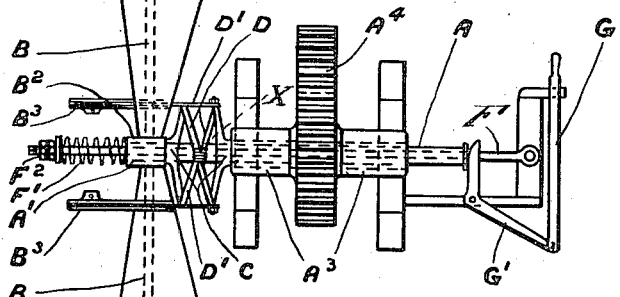

In carrying out my invention as shown in Figs. 1, 2, 3 and 9 I make the shaft of the propeller in two parts, a slidable part $A$, and a non-slidable part $A^1$. The slidable portion $A$ projects beyond both ends of the non-slidable part $A^1$ and is capable of rotation therewith, and is also capable of sliding axially therein. The non-slidable portion $A^1$ is carried in bearings $A^3$, and derives its motion from any source of power supply, by any suitable means, as by the spur wheel and pinion $A^4$.

The end of the slidable portion $A$ of the shaft is rigidly connected to a hub $B^2$ carrying two radial arms $B$ arranged at right angles thereto, which form pivots on which the blades $B^1$ of the propeller are carried. The blades $B^1$ are pivoted as near as possible to their center of pressure. I prefer to make them concave (see Fig. 7) and of suitable length and width, the edges being parallel for about say one-half to two-thirds of their length from the outer end and then tapering to the hub $B^2$. The arms $B$ extend about one-third the length of the blades. I do not wish to bind myself to the length of the parallel sides of the blades $B^1$ nor of the length of the arms $B$ as herein stated nor to any particular shape of blades $B^1$. Arms B³ are rigidly secured to the blades near the hub B².

At suitable distances from the hub B², cross heads C, are secured respectively to the non-slidable portion A¹ and to the slidable portion A of the shaft and to each of these cross heads C are pivoted a pair of triangular or other suitably shaped levers D. The levers D on opposite sides of the shaft are pivotally connected together at their outer ends, as shown at X. The ends of the cross-head C on the non-slidable portion A¹ of the shaft are pivotally connected to the ends of the arms B³ of the blades B¹ by means of links or rods D¹, and the arrangement is such that the movement of the slidable portion A of the shaft relative to the non-slidable portion A¹ of the shaft will cause an increase or decrease of the pitch of the blades.

I may provide simple means whereby the angle of incidence or pitch of the blades may be manually reduced when the engine is being started. This may be accomplished by means of a hand lever G pivotally connected to a bell-crank lever G¹. The bell-crank lever engages the rear end of the slidable part A and by moving said bell-crank the rear cross-arm C will be moved toward the front cross-arm C and the angle of the blades will be changed.

The part A slides on a rod F and a coiled spring F¹ is arranged between the slidable part of the shaft and a nut F² on the end of the rod F, so that said spring will tend to maintain the blades at their greatest pitch.

In the embodiment of the invention shown in Fig. 4, the parts A, F, F¹ and F² are omitted and instead of the front cross-arm being connected to the non-slidable part of the shaft, it is secured to the bearing A³. The front end of the shaft A¹ is provided with a piston E, operating in an air cylinder E¹. The cylinder may be provided with suitable means for admitting and exhausting air from each end of the cylinder, so that the pitch of the blades may be varied automatically or manually.

In Fig. 5 the cross-heads are arranged in front of the blades and two cylinders E¹ and two pistons E are employed instead of a single piston and cylinder. This apparatus will operate similar to the construction shown in Fig. 4.

In the construction shown in Fig. 6, the part F and the part A¹ are slidable and the rear end of the part F is connected by a spring F¹ to a stationary part. With this construction, the spring F¹ will permit the movement of the part F for automatically changing the pitch of the blades and the levers G and G¹ may be used for manually varying the pitch of said blades.

The details of construction may be varied as found most suitable. Furthermore I may have more than one pair of blades.

The blades B¹ are made approximately circular at the hub and then gradually assume a flattened oval as they approach the parallel portion which is made as thin as possible consistent with strength.

The operation of my invention is as follows—

The construction and arrangement of my propeller is such that the angle of incidence or pitch is regulated by the air pressure thereon. The air pressure on the blade should be greater on the inner or working surface than on the front.

When the aircraft is traveling with the wind the angle of incidence or pitch of the propeller decreases more or less according to the strength of the wind. Should the aircraft be traveling against the wind the angle of incidence or pitch will be increased more or less according to the strength of the wind.

When starting the engine, the pitch of the propeller is reduced by operating the lever G and bell crank G¹, or by creating an excess pressure behind the piston or pistons E thereby forcing the movable sleeve A forward, thereby causing the latter by the action of the arms B³ and links D¹ to turn the blades and decrease the angle of incidence or pitch. The lever G, or excess air pressure behind the piston E as the case may be, having been released, the blades, when driven at their working speed, assume their proper position (by action of the spring F¹, or air pressure in front of the piston E) according to the direction and strength of the wind.

I do not wish to bind myself to any exact details of construction when carrying out my invention but may vary them as may be necessary.

Having now fully described and ascertained my said invention, and the manner in which it is to be performed, I declare that what I claim is—

1. The combination with a rotatable shaft having a part slidable relative to another part, of cross-heads carried by each of said parts, links connecting said cross-heads and permitting one of the cross-heads to move relative to the other, propeller blades pivotally mounted on one of said parts, and links connecting said blades and one of said cross-heads, whereby the pitch of said blades will be changed when the slidable part is moved relative to the other part.

2. In a combination as defined in claim 1, yielding means for normally maintaining said cross-heads in close proximity to each other.

3. A combination as defined in claim 1, provided with means for manually sliding the slidable part relative to the other part.

4. In a combination as defined in claim 1, yielding means for normally maintaining the cross-heads in close proximity to each other, and means for manually sliding the slidable part relative to the other part.

5. The combination with a stationary rod of a hollow shaft slidably mounted on said rod, a non-slidable hollow-shaft mounted upon the slidable shaft, a cross-head fixed to the slidable shaft, a cross-head fixed to the non-slidable shaft, pivotally connected links carried by the cross-heads, blades pivotally mounted on the slidable shaft, links pivotally connecting the blades to the cross-head of the non-slidable shaft, a spring surrounding said rod and arranged between one end of the rod and the slidable shaft, and manually controlled means for moving the slidable shaft relative to the non-slidable shaft.

In testimony whereof I have signed my name to this specification in the presence of two subscribing witnesses.

JAMES FERRIER.

Witnesses:
 ALEXANDER ANDERSON,
 MABEL C. LOW.